United States Patent
Lefferts

[11] Patent Number: 5,183,442
[45] Date of Patent: Feb. 2, 1993

[54] DOUBLE HELIX, METHOD OF MAKING SAME AND SPIRAL LINK BELT MADE THEREFROM

[75] Inventor: Johannes Lefferts, Enschede, Netherlands

[73] Assignee: Siteg Siebtechnik GmbH, Ahaus-Alstatte, Fed. Rep. of Germany

[21] Appl. No.: 803,964

[22] Filed: Dec. 9, 1991

[30] Foreign Application Priority Data

Dec. 10, 1990 [DE] Fed. Rep. of Germany ....... 4039399

[51] Int. Cl.⁵ .............................................. F16G 1/00
[52] U.S. Cl. .......................................... 474/239; 57/3; 72/64; 156/425
[58] Field of Search ............... 474/237, 239; 156/431, 156/425; 57/3, 6, 9, 21; 72/64, 65; 425/391

[56] References Cited

U.S. PATENT DOCUMENTS 1,214,911  2/1917  Granz .............................. 474/239 X
4,090,832  5/1978  Moertel .

FOREIGN PATENT DOCUMENTS 0116894  8/1984  European Pat. Off. .
77147  12/1904  Fed. Rep. of Germany .
3003344  8/1980  Fed. Rep. of Germany .
3003343  8/1981  Fed. Rep. of Germany .
67627  11/1913  Switzerland ...................... 474/239

Primary Examiner—Thuy M. Bui
Attorney, Agent, or Firm—Sughrue, Mion, Zinn, Macpeak & Seas

[57] ABSTRACT

A double helix is formed from two partial helices each having the same winding direction and each having an oval cross-section with nearly straight upper and lower winding legs. The facing winding arcs of the two partial helices encircle each other. The upper winding legs of the partial helices extend at a different angle with respect to the longitudinal axis of the partial helices than the lower winding legs of the respective partial helix. The upper winding legs of one partial helix extend at the same angle with respect to the longitudinal axis as the lower winding legs of the other partial helix and vice versa.

5 Claims, 3 Drawing Sheets

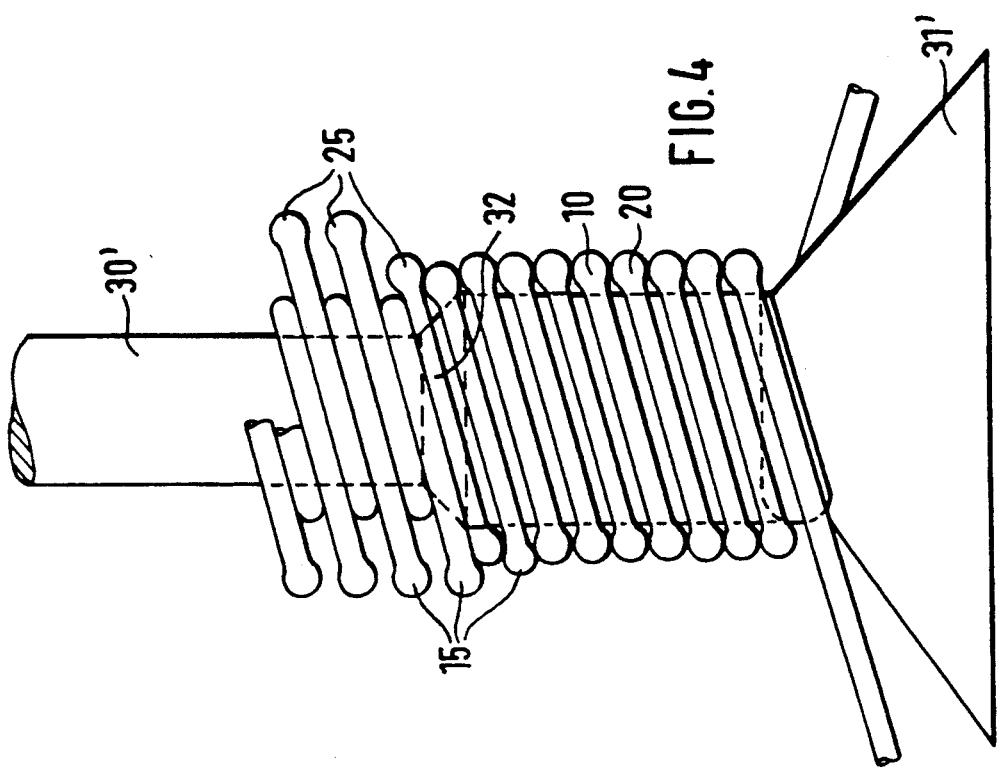
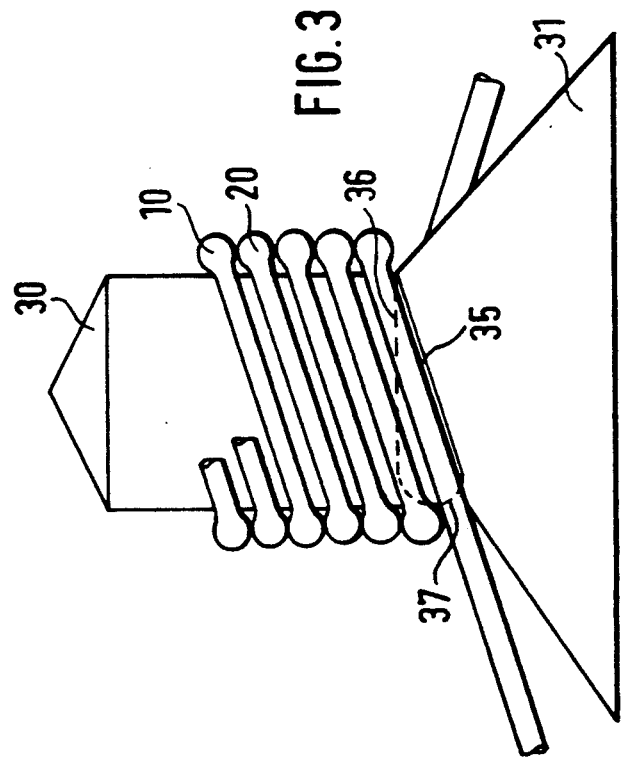

DOUBLE HELIX, METHOD OF MAKING SAME AND SPIRAL LINK BELT MADE THEREFROM

BACKGROUND OF THE INVENTION

The present invention relates to a double helix comprised of two partial helices of like winding direction, said partial helices each having an oval cross-section, substantially straight upper and lower winding legs and oppositely disposed winding arcs with mutually facing winding arcs of the two partial helices encircling each other. The invention further relates to the formation of the double helix by simultaneous wrapping two synthetic resin wires about a flattened mandrel and a spiral link belt fabricated from a plurality of said double helix structures.

A double helix is disclosed in EP-A-116 894 in which the partial helices are symmetrical in shape, i.e., the upper winding legs extend with respect to the longitudinal axis of the partial helices at the same angle as the lower winding legs. Such double helices are difficult to handle because the two partial helices have the tendency to slip one into the other. For the manufacture of a spiral link belt it is necessary, however, to laterally offset the partial helices relative to one another so that one partial helix can be joined to a partial helix of the next double helix by means of a pintle wire. Therefore, it is necessary to secure the two partial helices of one double helix in the laterally offset position, e.g., by applying an adhesive tape.

DE-A-30 47 989 discloses a simplified assembly of individual helices to form a spiral link belt wherein the individual helices have one set of winding legs, e.g., the lower winding legs, extending at right angles to the longitudinal axis and the other winding legs, in this case the upper winding legs, crimped so that they alone substantially determine the pitch of the helices. In this way, two individual helices of like or opposed winding direction can be shifted one into the other only somewhat less than half their width. In order to have a sufficiently wide channel for insertion of the pintle wire, the helices must be formed such that they have especially long winding legs. This is unfavorable if spiral link belts of low air permeability are to be produced.

Asymmetrically wound individual helices have also been disclosed in DE-A-30 01 472. The special configuration of the helices is apparent only from the drawing and it is not discernible whether it results in a simplification in the assembly of the individual helices to form a spiral link belt.

DE-A-30 03 344 discloses a method for the simultaneous formation of two individual helices for a spiral link belt in which two synthetic resin wires are wound by means of revolving thread guides in like sense on a stationary winding mandrel so as to cross each other alternately in each winding. The thus produced helices can be laterally separated after wind-up and a pintle wire inserted through the axis of the winding mandrel into the two individual helices to hold them together. The two individual helices connected by the pintle wire are then pulled apart against the pintle wire or turned apart around the pintle wire and are then assembled with further individual helix pairs to form a spiral link belt. The winding arcs of the two individual helices formed by this method and then interconnected do not embrace each other but are held together exclusively by the inserted pintle wire. Since the thus formed pairs of individual spirals have the same sense of winding, the contacting winding arcs of adjacent helices are not arranged in parallel but are arranged at a double pitch angle to the opposite alignment of the in reengaging windings, such pairs of individual helices develop a high degree of twist and can virtually not be processed. Moreover, this increases the spacing of the turns, i.e., the pitch of the spirals, excessively so that the clamping action is missing which facilitates the assembly of the helices.

A further difficulty in this mode of operation for winding helices results from the fact that the winding legs have different lengths. The winding legs extend at different angles relative to the longitudinal axis of the helices and the winding leg extending at the wider angle additionally travels along a longer path due to the fact that is crosses a winding leg of the other helix. During thermosetting of the spiral link belt assembled therefrom, this difference in length has the consequence that the winding arc is pulled somewhat around the pintle wire. This results in substantial deformation and damage to the pintle wire and to the helix wire. The individual helices produced pair-wise according to the method of DE-A-30-03-344 with an oval cross-section have an excessively high pitch. In the production of helices having an oval cross-section by winding the wire onto a mandrel, the helix wire automatically widens in the region of the winding arcs because at this point, the tension in the fed helix wire increases briefly due to the greater transverse dimension of the mandrel. These flattened regions are, in fact, desirable as coupling heads. However, when two helix wires are wound onto a mandrel, this has the consequence that the helices formed in pairs have a pitch corresponding to twice the width of the coupling heads. Several methods for assembling helices to form a spiral link belt, however, require tension spring-like bias within the helices which in turn is possible only if the helices have a pitch not higher than twice the helix wire diameter.

SUMMARY OF THE INVENTION

The present invention has the object of permitting the use of double helices for the manufacture of a spiral link belt without the effect that the partial helices of the double helix have the tendency to slip one into the other.

The present invention provides a new and improved double helix construction comprised of two partial helices of equal winding direction, said partial helices each having an oval cross-section with substantially straight upper and lower winding legs and facing winding arcs encircling each other, wherein said upper winding legs of the partial helices extend at a different angle with respect to a longitudinal axis of the partial helices than the lower winding legs of the respective partial helices and wherein said upper winding legs of one partial helix extend at the same angle with respect to the longitudinal axis as the lower winding legs of the other partial helix and vice-versa.

The present invention provides a ne and improved method for forming the double helix of the present invention, wherein the two helix wires are wound in parallel around a tapering mandrel.

The present invention provides a new and improved spiral link belt constructed from a plurality of double helices according to the present invention, wherein the partial helices of adjacent double helices have opposite winding directions and wherein the winding arcs of one partial helix of one double helix are engaged in zipper fashion with the winding arcs of a partial helix of an adjacent double helix with a pintle wire being inserted through the channel formed thereby.

The advantages attainable by the present invention reside especially in the fact that the capacity of existing helix winding machinery can be substantially increased by minor modifications and spiral link belts can be manufactured simpler and faster with the double helices of the present invention.

The double helix preferably consists of monofilaments made of thermoplastic material melting in a range above 150° C. The preferable diameter ranges between 0.2 mm and 2.O mm. The monofilaments generally are of circular diameter. Depending on the technical requirements to be met by the final product, they also can have rectangular, rectangular with rounded edges, elliptical, or dumbbell-shaped cross-sections. The monofilaments may consist of several components including at least one thermoplastic component.

BRIEF DESCRIPTION OF THE DRAWINGS

Examples of the invention are explained in more detail hereafter with reference to the drawings in which:

FIG. 3 is a side view showing the position of the windings as they are wound onto a mandrel of uniform cross-section;

FIG. 4 is a side view showing the position of the windings as they are wound onto a mandrel of tapering cross-section.

DETAILED DESCRIPTION OF THE INVENTION

Figure 1:
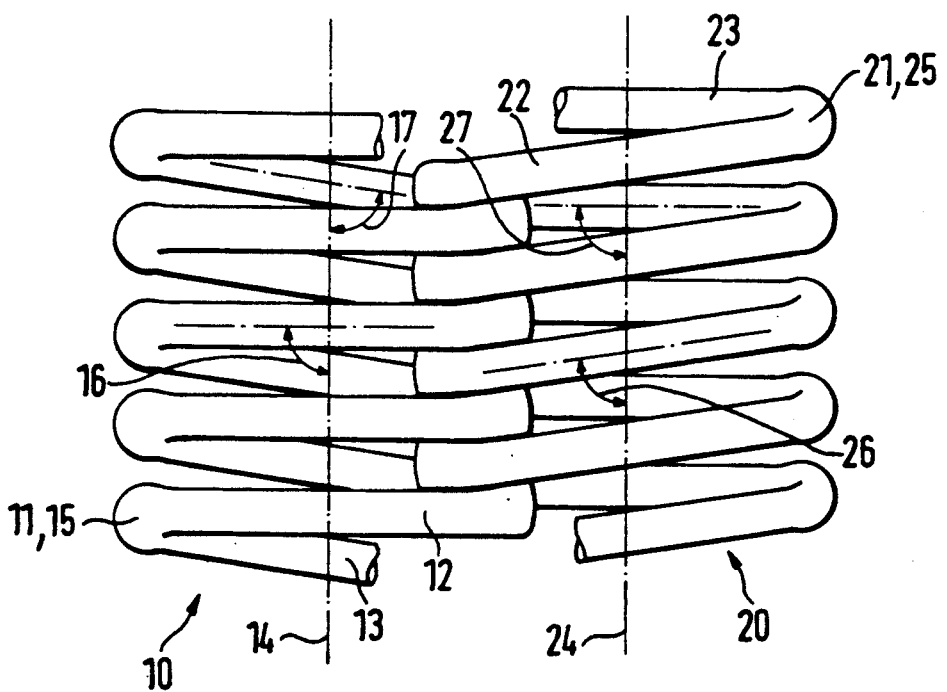
FIG. 1 is a top plan view of several windings of a double helix.

In FIG. 1, the double helix consists of a first partial helix 10 and of a second partial helix 20. The partial helices 10,20 each consist of a number of windings composed of substantially semicircular winding arcs 11,21 joined by upper winding legs 12,22 and lower winding legs 13,23.

Figure 2:
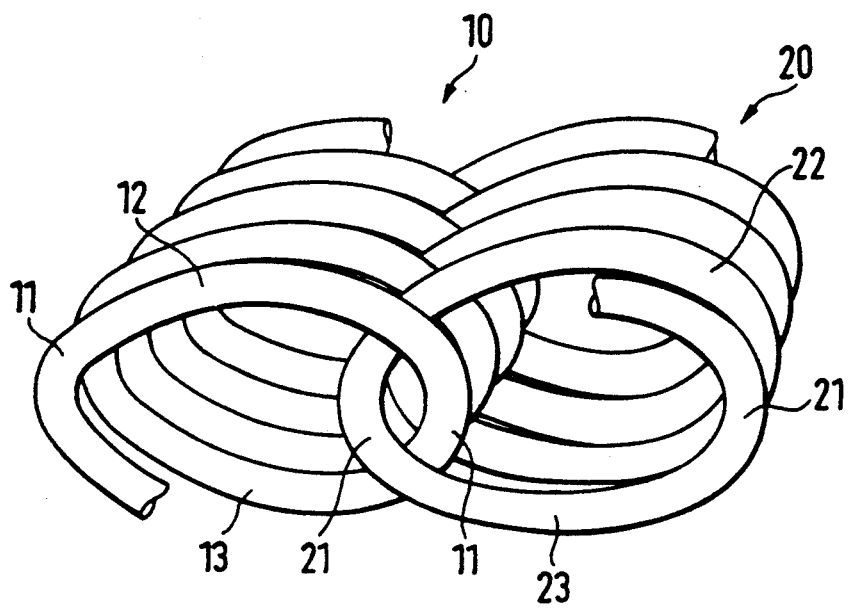
FIG. 2 is a perspective view of a short piece of a double helix.

The pitch of the partial helices 10,20 is non-uniform. In the first partial helix 10, the upper winding legs 12 have substantially no pitch:, i.e., they are disposed in a plane normal to the longitudinal axis 14 as shown in FIG. 2. The lower winding legs 13, on the other hand, have all the more pitch and nearly all the pitch concentrates on the lower winding legs 13. Within the winding arcs 11, the pitch has intermediate values. The angle 16, at which the upper winding legs 12 extend with respect to the longitudinal axis 14, is thus wider than the angle 17 at which the lower winding legs 13 extend with respect to the longitudinal axis 14 of the partial helix 10. The angle 16 is 90° in the ideal case.

In the second partial spiral 20, the conditions are reversed, i.e., the pitch is minimal in the lower winding legs 23 and concentrates nearly exclusively on the upper winding legs 22. The angle 26 at which the upper winding legs 2 extend relative to the longitudinal axis 24, is thus narrower than the angle 27 at which the lower winding legs 23 extend. In the ideal case, the angle 27 is again 90°.

The mutually facing winding arcs 11,21 of the two partial helices 10,20 encircle each other. This engagement does not require any particular deformation of the winding arcs 11,21 since in the winding arcs 11,21, there is a pitch and the winding arcs 11,21 at the point of contact of the two partial helices 10,20 extend at twice the pitch angle with respect to each other. This is a consequence of the equal sense of winding of the two partial helices 10,20. In the conventional assembly of spiral link belts, as disclosed in DE-A-29 38 221, adjacent helices have an opposite sense of winding, so that the contacting winding arcs are disposed in one plane and can be secured one to the other by means of a pintle wire.

In the region of the winding arcs 11,21, the helix wire is flattened, i.e., the cross-section of the helix wire is enlarged in the direction of the longitudinal axes 14,24 of the partial helices 10,20. The winding arcs 11,21 thus have coupling heads 15,25. By means of the coupling heads 15,25, two double helices can be caused to engage so that the form-locking engagement effected by the coupling heads 15,25 is sufficient to safely hold the double spirals together and to allow uncomplicated insertion of the pintle wire in the usual manner. The partial helices of adjacent double helices however, must be wound in the opposite direction.

The assembly of the double helices of the present invention to form spiral link belt is effected substantially in the same way as disclosed in DE-A-29 38 221 for single helices. The only difference is the use of a double helix in lieu of a single helix. The spiral link belt composed of double helices according to the present invention and joined by pintle wires is thermoset in the usual way. The high longitudinal tension exerted during thermosetting, together with the softening of the spiral link belt material, has the consequence that the pitch within the partial helices 10,20 is balanced so that in the final spiral link belt, the upper winding legs 12,22 and the lower winding legs 13,23 assume nearly equal pitch and extend at equal angles with respect to the longitudinal axis 14,24. When extending at a narrow angle, the winding legs have a greater length than when extending at a wider angle. In order to prevent that, during thermosetting this difference in length attempts to equalize by shifting the winding arcs 11,12 about the pintle wires and about the winding arcs of the other partial helix of the double helix. The partial helices 10,20 will then be shaped such that the upper winding legs 12,22 and the lower winding legs 13,23 have equal length despite the different angles at which they extend relative to the longitudinal axis 14,24. This compensation in length is achieved in that the upper winding legs 12 of the first partial helix 10 and the lower winding arcs 23 of the second partial helix 20—i.e., the winding arcs extending at the wider angle with respect to the longitudinal axis 14,24 have a slightly bent or curved shape. This can be achieved by the respective shape of the mandrel in the manufacture of the double helix according to the present invention.

For the production of the double helix of the present invention, two synthetic resin wires, generally polyester monofilament having a diameter within the range of 0.5 to 1.O mm, are fed one beside the other to a rotating mandrel, or are wound about a stationary mandrel 30. In order to obtain the oval cross-sectional configuration of the partial spirals, the mandrel has a similar flattened cross-section. The flattening on opposite sides of the mandrel 30 is different in order to achieve the above mentioned curvature or bulge of the winding legs 13 and 22 which extend at a wider angle to the longitudinal axis 14,24. In the course of this process, the tension within the fed synthetic resin wires increases each time the longer cross-sectional dimension of the mandrel is disposed in parallel to the direction of the supplied synthetic resin wires, which results in the formation of the enlarged coupling heads 15,25 in the partial helices 10,20. In order to reach the different pitch angles in the winding legs, the mandrel 30 is so designed that at the opposite, flattened sides of the mandrel 30, the helix wire is wound up either without or with double pitch, compared with a mandrel serving to form helices of uniform pitch. To this end, it is sufficient to so modify the shape of the highly conical mandrel base 31 so that the shoulder 35 between the conical mandrel base 31 and the mandrel 30 is not disposed in a plane normal to the mandrel axis, as shown in FIG. 3. The shoulder 35 on the one flattened side of the mandrel 30 is disposed at an angle of about 20° while on the other, flattened side, the shoulder 36 (indicated by a broken line in FIG. 3), is disposed at right angles to the mandrel axis. These two shoulders are then joined on one of the two highly curved ends of the mandrel 30 by a steeply rising shoulder 37. The two helix wires are fed, or wound, such that they arrive at the conical mandrel base 31 and slide along said base to the mandrel 30. The part of the spiral already wound onto the mandrel 30 is pushed forward by the newly added windings (in the upward direction as shown in FIG. 3).

The pitch of the partial helices 10,20 is determined by the width of the coupling heads 15,25 and thus, with the conventional methods for producing the helices, it would amount to more than twice the helix diameter. This may be deleterious for the later assembly of a plurality of double helices to form a spiral link belt. With such a high pitch of the partial helices, the coupling heads 15,25 of adjacent double helices, would not mutually clamp each other (FIG. 3), so that the double helices might separate prior to the insertion of the pintle wire. In order to achieve a pitch in the partial helices 10,20, despite the coupling heads 15,25, which amounts to twice the helix diameter, a tapering mandrel 30' is used. The diameter taper is suitably achieved by a conical step 32. The partial helices then slide along the mandrel towards each other such that the coupling heads 15,25 drop into the cavities of the respective other partial helix 10,20 (FIG. 4). The pitch of the partial helices thereby becomes less than the width of the coupling heads 15,25 so that, when two double helices are mutually engaged, sufficient clamping or sufficient form locking exists between the couplings head 15,25. For attaining a pitch of the partial helices 10,20, that is less than twice the width of the coupling heads 15,25, it is prerequisite that the two partial helices are wound in parallel and the winding legs do not cross each other.

After the double helix has run off the mandrel, it does not yet have the shape shown in FIGS. 1 and 2 since the two partial helices 10,20 are disposed one within the other, i.e., their longitudinal axes 14,24 coinoide. The property that the two partial helices 10,20 spontaneously offset relative to each other is attained by the double helix of the invention only after one of the two partial helices 10,20 is turned half a turn about its longitudinal axis so that the winding legs of the two partial helices extending at a wider angle to the longitudinal axis are disposed on opposite sides, as is shown in FIG. 1. After having travelled over and off the mandrel, the cross-section of the partial helices 10,20 is elliptical, rather than oval. The winding legs 12,13; 22,23 are thus slightly bent outwardly, rather than straight.

Figure 5:
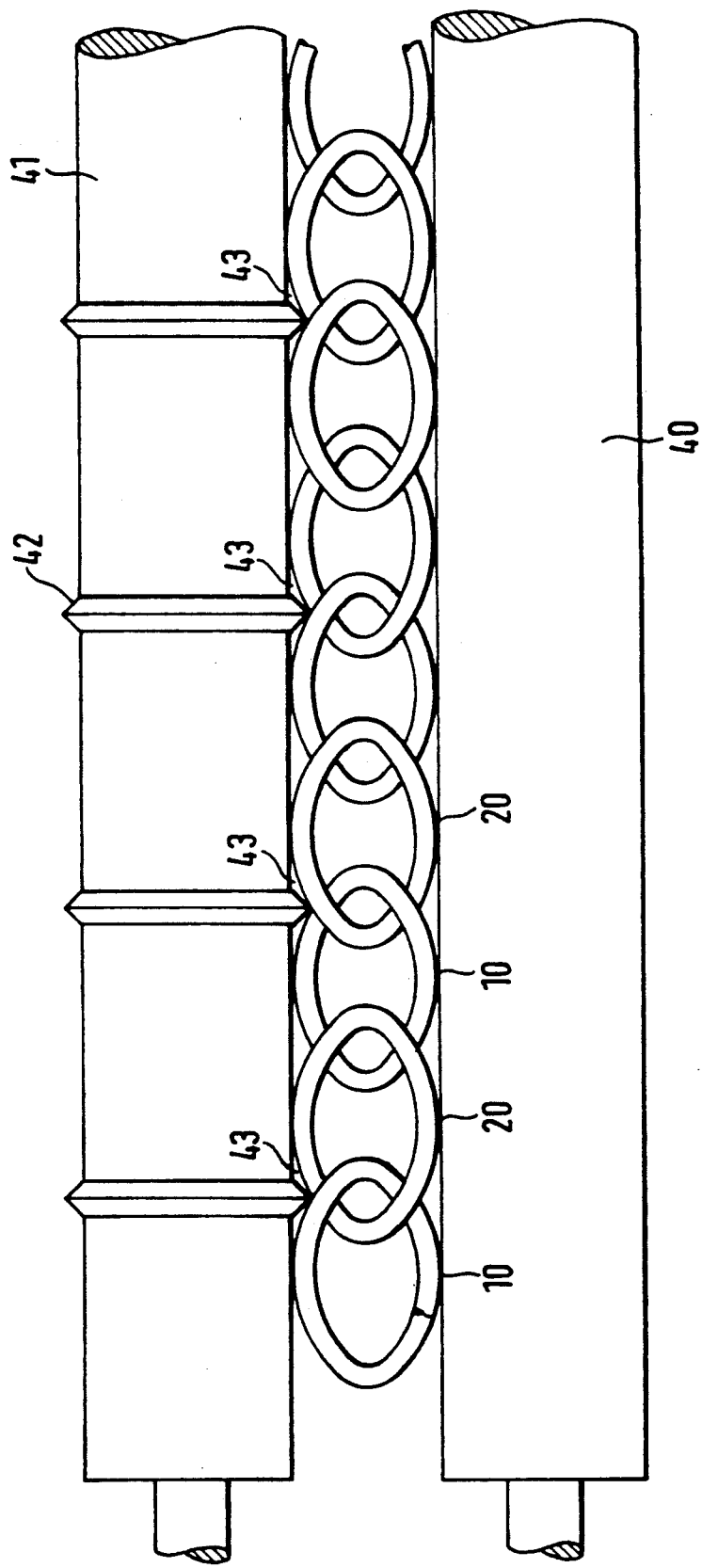
FIG. 5 is a plan view showing the apparatus for assembling a plurality of double helices to form a spiral link belt.

The assembly of the spirals is rendered far simpler with the use of double helices than with individual helices. This is so because double helices already have acquired the necessary pitch required for the assembly from the production method. Individual helices produced with a conventional method and wound turn by turn must first be drawn in pairs through a closing gap, whereby they are carefully and uniformly stretched in order to reach the required pitch at which the pitch of the helices approximately corresponds to twice the pintle wire diameter, and the winding arcs of the two helices slip one into the other in a meshing manner. In the method of the present invention, the closing gap is missing. The device for assembling a plurality of double helices to form a spiral link belt is equipped with a smooth lower roll 40 and an upper roll 41 is provided with peripheral rims 42 (FIG. 5). The lower roll 40 and the upper roll 41 are supported in parallel to each other and form a roll gap corresponding to the smaller transverse dimension of the partial helices 10,20 so that the double helices can be passed through the roll gap in frictional engagement. The spacing of the peripheral rims 42 of the upper roll 41 corresponds to the pitch of the double helices in the spiral link belt (unit of length/number of double helices). The beginning of each double helix is opened up and is introduced into the roll gap such that one of the peripheral rims 42 engages the trough 43 forming between the two partial helices 10,20. Alternately, left-hand and right-hand double helices are inserted. When the double helices pass through the roll gap during operation, the double helices progressively open up automatically. Otherwise, the method operations similar to that of DE-A-30 17 378 or DE-A-3 127 149. As in the known methods, the double helices are alternatingly fed slightly from above and slightly from below, in order that the winding arcs of adjacent double helices are urged one into the other by vertical forces. As in the known method, one pintle wire is inserted into each channel formed by overlapping winding arcs of adjacent helices. In the method of the present invention, one pintle wire is inserted preferably also into the channel formed by the mutually embracing widening arcs of the two partial helices of a double helix, so that the number of pintle wires is equal to the number of the partial helices. For the coherence of the spiral link belt, said pintle wires are not necessary. However, if, for example, an especially high permeability of the spiral link belt is desired, the pintle wires within the partial spirals forming a double spiral may be omitted so that the number of pintle wires is then equal to the number of double helices.

EXAMPLE

A polyester monofilament having a diameter of 0.6 mm is used as the helix wire. Two such helix wires are wound in parallel onto the mandrel shown in FIG. 4, the longer diameter measuring 5.4 mm and the shorter diameter measuring 3.2 mm to form a double helix of oval cross-section. The mandrel 30 has a cross-section of 4.7×1.8 mm which, after a length of 5 mm, tapers by a conical step at an angle of 45° to 3.4×1.5 mm. Thirty-two such double helices are assembled by means of the assembling device shown in FIG. 5 with the rim spacing on the upper roll being 6.1 mm. The group of 32 double helices is locked one to the other by the insertion of 31 pintle wires in the form of a polyester monofilament of 0.9 mm diameter. Thus, from a group of 32 double helices, a spiral link belt of 16.5 double spirals/100 mm is assembled. By thermosetting the belt, the helix density shrinks to 13.5 double helices/100 mm.

While the invention has been particularly shown and described with reference to preferred embodiments thereof, it will be understood by those in the art that the foregoing and other changes in form and details may be made therein without departing from the spirit and scope of the invention.

What is claimed is:

1. A double helix comprises two partial helices having the same winding direction, said partial helices each having an oval cross-section with substantially straight upper and lower winding legs and facing winding arcs encircling each other, wherein said upper winding legs of the partial helices extend at a different angle with respect to longitudinal axes of the partial helices than the lower winding legs of the respective partial helices, said upper winding legs of one partial helix extend at the same angle with respect to the longitudinal axes as the lower winding legs of the other partial helix and vice versa.

2. A double helix according to claim 1, wherein the pitch of the partial helices is equal to twice the wire diameter.

3. A double helix according to claim 1, wherein the winding legs extending at a wider angel are slightly bent to attain equal lengths of the upper and lower winding legs.

4. A method for the production of a double helix comprising;
    winding two helix wires in parallel in the same direction about a tapering mandrel having substantially flat opposite sides connected by two curved ends to form two partial helices each having an oval cross-section with the legs of each helix adjacent one flat surface being substantially perpendicular to a longitudinal axis of the mandrel and the legs of the helices adjacent the opposite flat side being disposed at an acute angle relative to a longitudinal axis;
    removing the two wound partial helices from an end of the mandrel; and
    rotating one of the helices a half turn about the longitudinal axis thereof so that the winding legs of the two partial helices extending at an acute angle to the longitudinal axis are disposed on opposite sides with facing winding arcs encircling each other.

5. A spiral link belt comprising:
    a plurality of double helices;
    each double helix comprising two partial helices having the same winding direction, said partial helices each having an oval cross-section with substantially straight upper and lower winding legs and facing winding arcs encircling each other, wherein said upper winding legs of the partial helices extend at a different angle with respect to longitudinal axes of the partial helices than the lower winding legs of the respective partial helices, said upper winding legs of one partial helix extend at the same angle with respect to the longitudinal axes as the lower winding legs of the other partial helix and vice versa, and
    wherein adjacent double helices have opposite winding directions with the winding arcs of one partial helix of a double helix engaged in alternating intermeshed fashion with the winding arcs of a partial helix of an adjacent double helix and having a pintle wire inserted through a channel formed thereby.

* * * * *